United States Patent
Park et al.

(10) Patent No.: US 10,880,725 B2
(45) Date of Patent: Dec. 29, 2020

(54) MULTI-SIM DEVICE AND METHOD OF OPERATING THE SAME

(71) Applicant: SAMSUNG ELECTRONICS CO., LTD., Suwon-si (KR)

(72) Inventors: Min-su Park, Seoul (KR); Jun-kyoung Lee, Yongin-si (KR); Jong-hoon Ryu, Suwon-si (KR); Young-yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/514,508

(22) Filed: Jul. 17, 2019

(65) Prior Publication Data

US 2020/0137556 A1    Apr. 30, 2020

(30) Foreign Application Priority Data

Oct. 29, 2018    (KR) .................. 10-2018-0130236

(51) Int. Cl.
| | |
|---|---|
| *H04W 8/18* | (2009.01) |
| *H04W 88/06* | (2009.01) |
| *H04L 1/00* | (2006.01) |
| *H04W 76/27* | (2018.01) |
| *H04W 68/00* | (2009.01) |

(52) U.S. Cl.
CPC .......... *H04W 8/186* (2013.01); *H04L 1/0061* (2013.01); *H04W 8/183* (2013.01); *H04W 68/005* (2013.01); *H04W 76/27* (2018.02); *H04W 88/06* (2013.01)

(58) Field of Classification Search
CPC ............... H04W 88/06; H04W 48/18; H04W 72/1215; H04W 16/14
See application file for complete search history.

(56) References Cited

U.S. PATENT DOCUMENTS

| | | | |
|---|---|---|---|
| 9,049,723 B2 | 6/2015 | Dhanda et al. | |
| 9,167,446 B2 | 10/2015 | Sikri et al. | |
| 9,167,592 B1* | 10/2015 | Hsu | ........................ H04L 47/30 |
| 9,338,713 B2 | 5/2016 | Chakravarthy et al. | |
| 9,351,137 B2 | 5/2016 | Kasilya Sudarsan et al. | |
| 9,380,525 B2 | 6/2016 | Kanamarlapudi et al. | |
| 2015/0245309 A1* | 8/2015 | Nayak | .................. H04W 8/183 |
| | | | 455/435.3 |
| 2016/0142087 A1* | 5/2016 | Inampudi | .............. H04W 48/16 |
| | | | 455/558 |
| 2016/0249408 A1 | 8/2016 | Thiruvenkatachari et al. | |

(Continued)

*Primary Examiner* — Raj Jain
(74) *Attorney, Agent, or Firm* — Sughrue Mion, PLLC

(57) ABSTRACT

A multi-subscriber identification module (SIM) device is provided, and includes first and second SIMs, first and second radio frequency (RF) resources, and a baseband processor. The first and second SIMs are for using first and second services of first and second networks respectively. The first RF resource supports a non-limiting channel configuration use in accordance with a radio resource control (RRC) protocol. The second RF resource supports a limiting channel configuration use in accordance with the RRC protocol. The baseband processor, in a dual radio (DR) mode, configures one of the first and second SIMs as a main SIM based on information on the first and second networks, allots the first RF resource to the main SIM, configures the other one as a sub-SIM, and allots the second RF resource to the sub-SIM.

20 Claims, 13 Drawing Sheets

(56) References Cited

U.S. PATENT DOCUMENTS

| | | |
|---|---|---|
| 2016/0278128 A1* | 9/2016 | Krishnamurthy ... H04W 74/085 |
| 2017/0127436 A1 | 5/2017 | Li et al. |
| 2017/0164398 A1* | 6/2017 | Rajaee ................. H04L 1/1854 |
| 2017/0230932 A1 | 8/2017 | Challa et al. |
| 2018/0097585 A1 | 4/2018 | Dev et al. |
| 2018/0234878 A1* | 8/2018 | Anand ................. H04W 48/16 |
| 2020/0128481 A1* | 4/2020 | Kim ..................... H04W 48/14 |
| 2020/0137556 A1* | 4/2020 | Park ..................... H04W 8/183 |
| 2020/0137755 A1* | 4/2020 | Lee .................. H04W 72/0453 |

\* cited by examiner

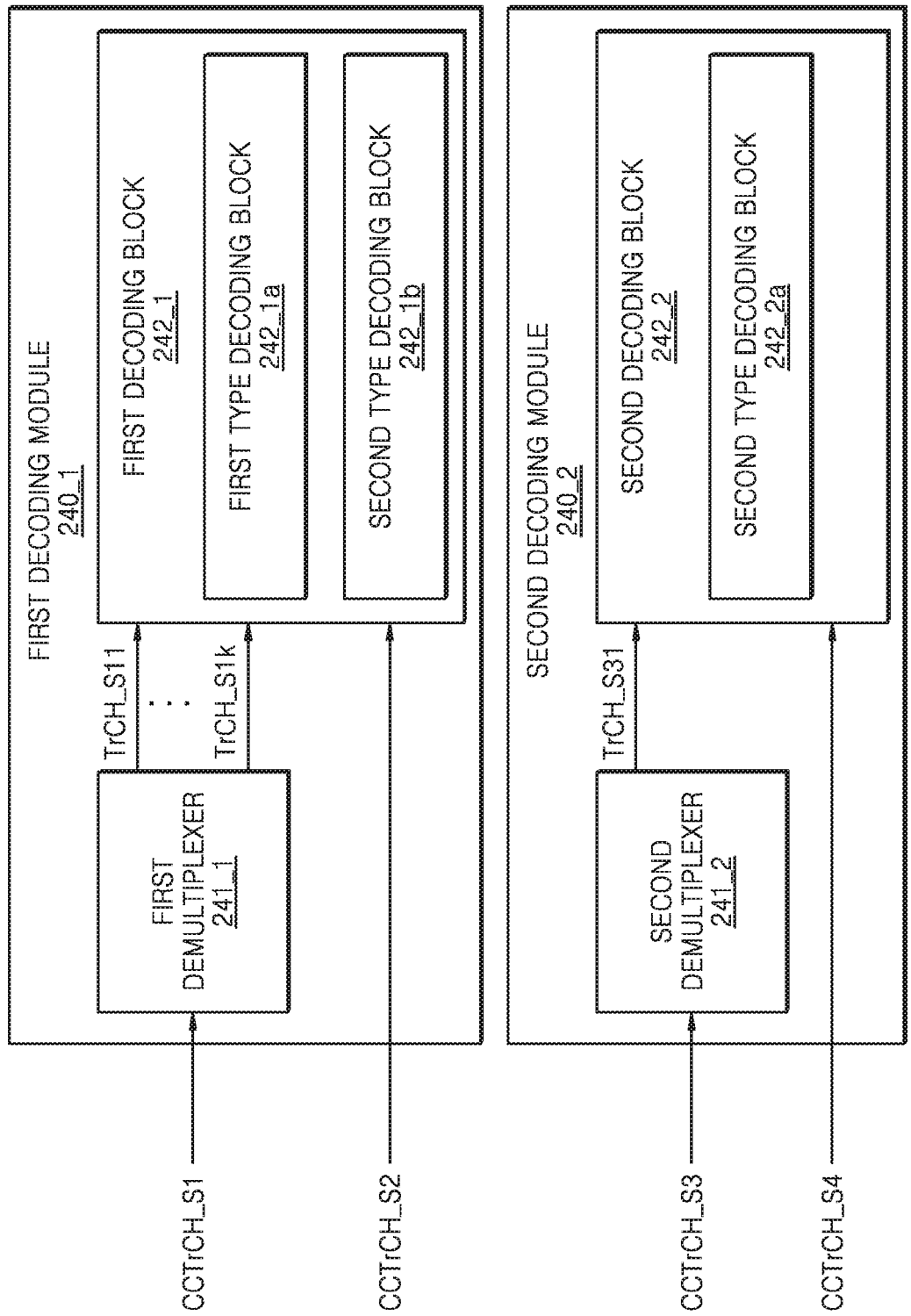

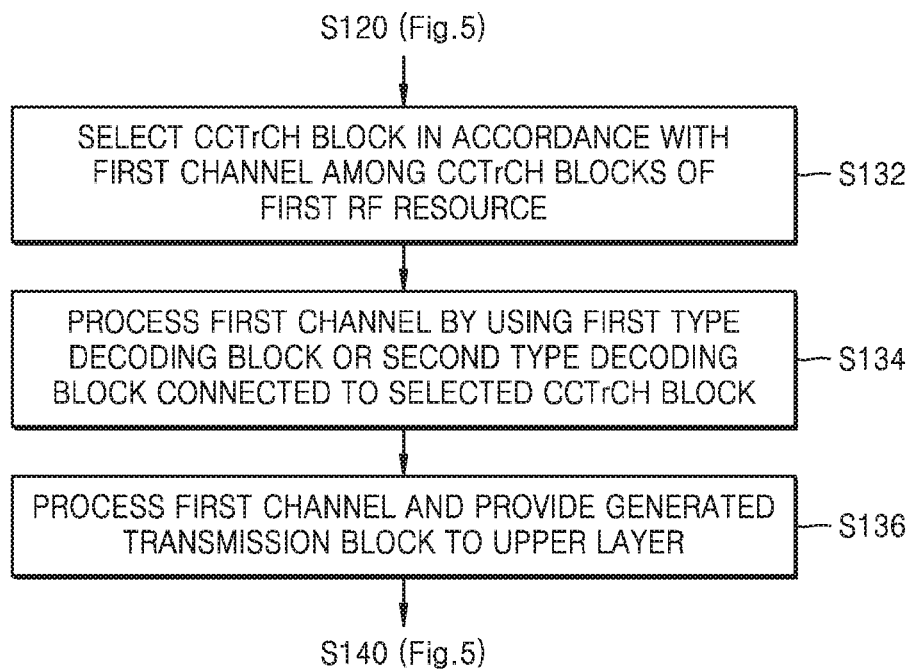
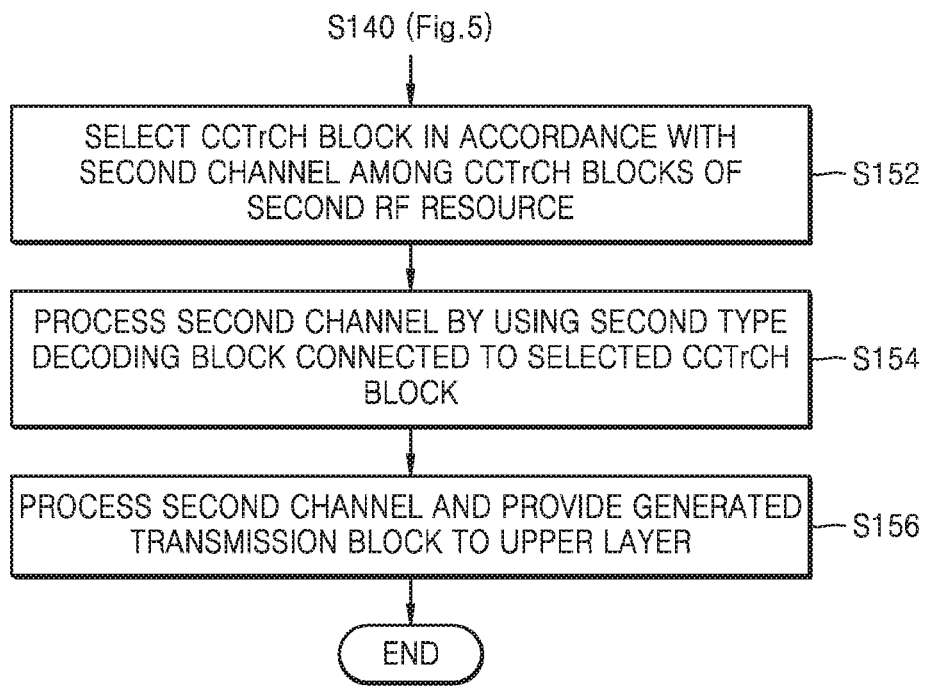

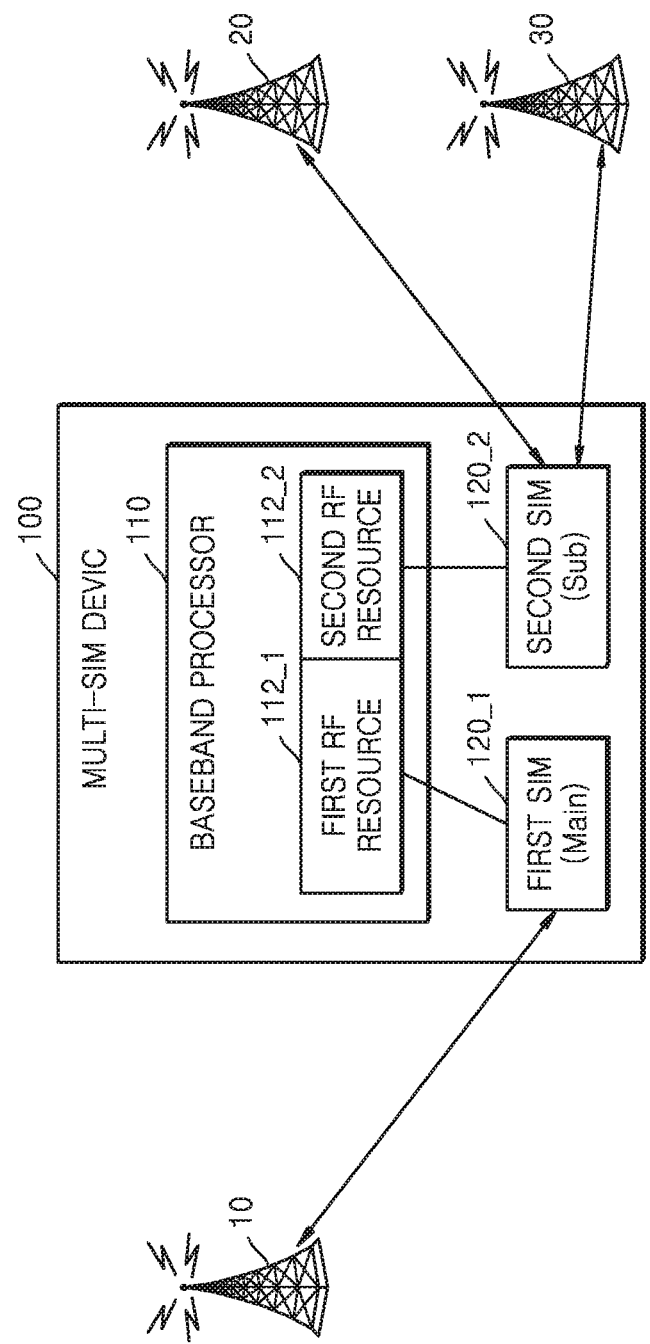

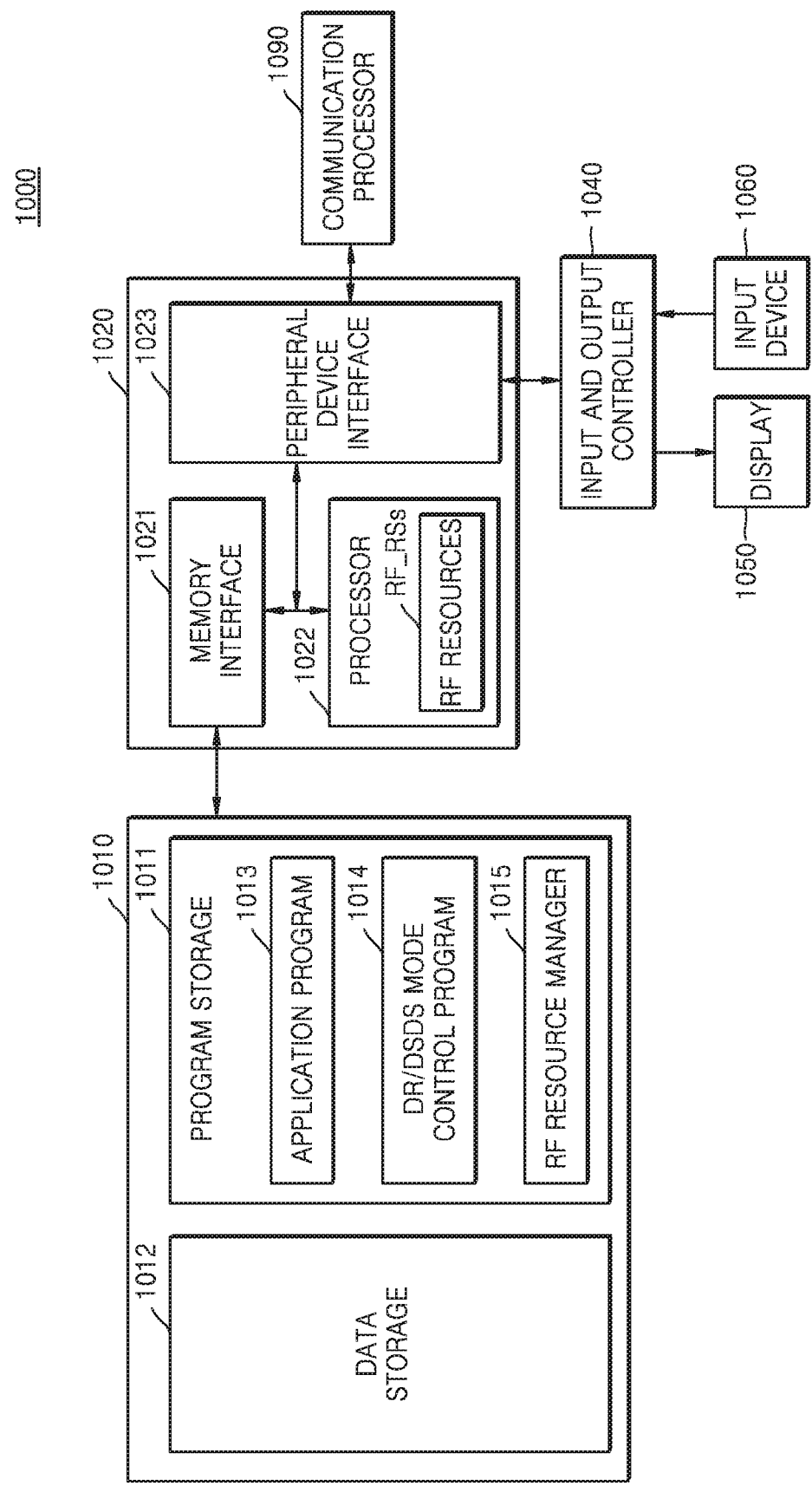

MULTI-SIM DEVICE AND METHOD OF OPERATING THE SAME

CROSS-REFERENCE TO RELATED APPLICATION

This application claims priority from Korean Patent Application No. 10-2018-0130236, filed on Oct. 29, 2018, in the Korean Intellectual Property Office, the disclosure of which is incorporated by reference herein in its entirety.

BACKGROUND

1. Field

The present disclosure relates to a multi-subscriber identification module (SIM) device including radio frequency (RF) resources allotted to a plurality of SIMs and managing allotment of the RF resources and a method of operating the same.

A multi-SIM device such as a mobile phone, a personal digital assistant (PDA), a tablet PC, or a laptop PC may include two or more SIM cards. Each of the SIM cards may include international mobile subscriber identity (IMSI) information and key information by which a user of the multi-SIM device may be checked and authenticated by a service provider. In the multi-SIM device, the user may access various networks by using a plurality of SIMs.

When the multi-SIM device is a dual SIM dual standby (DSDS) device, one RF resource is shared by the plurality of SIMs. Therefore, in the case in which RF resource use request periods of the SIMs overlap, due to a SIM that does not receive the RF resource, communication performance of the multi-SIM device deteriorates. In addition, when the multi-SIM device is a dual SIM dual active (DSDA) device, a plurality of RF resources are provided and respectively allotted to the SIMs. Therefore, better communication performance may be provided than when the multi-SIM device is the DSDS device. However, since required hardware or software specifications are large, expenses for mass-producing the multi-SIM device and an amount of power consumption of the multi-SIM device may remarkably increase.

SUMMARY

It is an aspect to provide a multi-subscriber identification module (SIM) device which provides better communication performance than a dual SIM dual standby (DSDS) device, which includes radio frequency (RF) resources for reducing expenses and an amount of power consumption in comparison with a dual SIM dual active (DSDA) device, and which efficiently allots the RF resources to a plurality of SIMs and a method of operating the same.

According to an aspect of an embodiment, there is provided a multi-subscriber identification module (SIM) device comprising: a first SIM for using a first service of a first network; a second SIM for using a second service of a second network; a first radio frequency (RF) resource that supports a non-limiting channel configuration use in accordance with a radio resource control (RRC) protocol and processes a non-periodic channel or a periodic channel; a second RF resource that supports a limiting channel configuration use in accordance with the RRC protocol and processes a periodic channel; and a baseband processor that, in a dual radio (DR) mode of the multi-SIM device, configures one of the first SIM and the second SIM as a main SIM based on information on the first network and the second network, allots the first RF resource to the main SIM, configures the other one of the first SIM and the second SIM as a sub-SIM, and allots the second RF resource to the sub-SIM.

According to another aspect of an embodiment, there is provided a multi-subscriber identification module (SIM) device comprising a plurality of SIMs; a plurality of radio frequency (RF) resources allotted to the plurality of SIMs to process a plurality of channels received from a plurality of networks corresponding to the plurality of SIMs; and in response to RF resource use request periods of at least two object SIMs among the plurality of SIMs overlapping, a baseband processor allots a first RF resource capable of being configured for non-periodic channel processing or periodic channel processing among the plurality of RF resources to a SIM configured as a main SIM among the at least two object SIMs and allots a second RF resource capable of being configured for the periodic channel processing among the plurality of RF resources to a SIM configured as a sub-SIM among the at least two object SIMs.

According to another aspect of an embodiment, there is provided a method of operating a multi-subscriber identification module (SIM) device including a plurality of SIMs, the method comprising generating a radio frequency (RF) resource request from one object SIM among the SIMs; determining whether the one object SIM is configured as a main SIM to which a first RF resource is allotted or a sub-SIM to which a second RF resource is allotted; and in response to determining that the one object SIM is configured as the main SIM, performing non-limiting channel configuration for processing a non-periodic channel or a periodic channel on the first RF resource, and in response to determining that the one object SIM is configured as the sub-SIM, performing limiting channel configuration for processing the periodic channel on the second RF resource.

BRIEF DESCRIPTION OF THE DRAWINGS

Embodiments will be more clearly understood from the following detailed description taken in conjunction with the accompanying drawings in which:

FIGS. 4A and 4B are block diagrams illustrating a first decoding module and a second decoding module of the first RF resource and the second RF resource, respectively, of FIG. 3 in detail;

FIG. 6A is a flowchart illustrating an operation S130 of FIG. 5 in detail and FIG. 6B is a flowchart illustrating an operation S150 of FIG. 5 in detail;

FIG. 8 is a view illustrating an operation of a multi-SIM device according to an embodiment;

FIG. 10 is a block diagram illustrating an electronic device according to an embodiment.

DETAILED DESCRIPTION

Each of base stations (BS) as a main agent for communicating with a terminal and allotting communication network resources to the terminal may be at least one of a cell, a BS, a NodeB (NB), an eNodB (eNB), a next generation radio access network (NG RAN), a wireless access unit, a BS controller, and a node on a network.

A multi-subscriber identification module (SIM) device as a main agent for communicating with a BS or another multi-SIM device may be referred to as a node, user equipment (UE), next generation UE (NG UE), a mobile station (MS), mobile equipment (ME), a device, or a terminal.

The multi-SIM device may include at least one of a smart phone, a tablet PC, a mobile telephone, an image telephone, an electronic book reader, a desktop PC, a laptop PC, a netbook computer, a personal digital assistant (PDA), a portable multimedia player (PMP), an MP3 player, a medical device, a camera, and a wearable device. In addition, the multi-SIM device may include at least one of a television, a digital video disk (DVD) player, an audio system, a refrigerator, an air conditioner, a vacuum cleaner, an oven, a microwave oven, a washing machine, an air cleaner, a set top box, a home automation control panel, a security control panel, a media box (for example, Samsung HomeSync™, Apple TV™, or Google TV™), a game console (for example, Xbox™ or PlayStation™), an electronic dictionary, an electronic key, a camcorder, and an electronic frame. In addition, the multi-SIM device may include at least one of various medical devices, for example, various portable medical measuring devices such as a glucometer, a heart rate meter, a blood pressure meter, and a temperature detector, magnetic resonance angiography (MRA), magnetic resonance imaging (MRI), a computed tomography (CT) scanning machine, and an ultrasonic machine, a navigation device, a global navigation satellite system (GNSS), an event data recorder (EDR), a flight data recorder (FDR), a vehicle infotainment device, electronic equipment for ships, for example, a navigation device for ships or a gyro compass, avionics, a security device, a head unit for a vehicle, an industrial or home robot, a drone, an automated teller machine (ATM) of a financial institution, point of sales (POS) of a store, and an Internet of Things (IoT) device, for example, a light bulb, various sensors, a sprinkler device, a fire alarm, a temperature controller, a streetlight, a toaster, fitness equipment, a hot water tank, a heater, or a boiler. The multi-SIM device may include various kinds of multimedia systems capable of performing communication functions.

Hereinafter, an embodiment will be described in detail with reference to the accompanying drawings.

Figure 1:
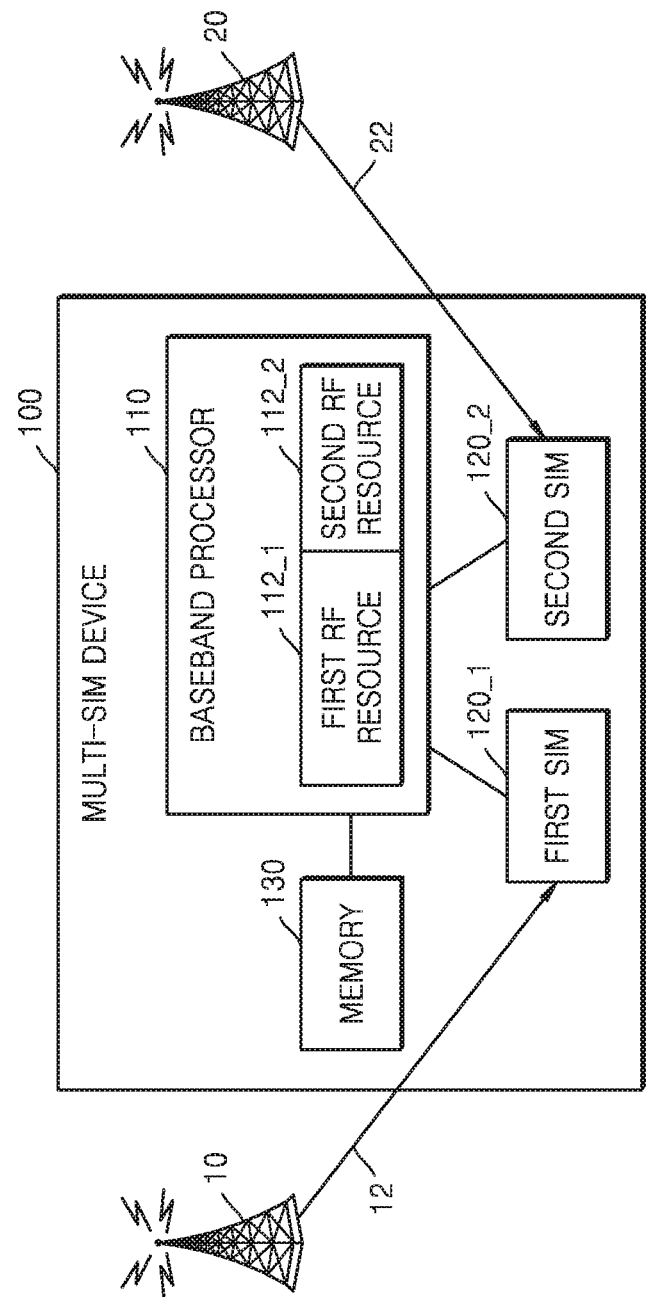
FIG. 1 is a view illustrating a wireless communication system including a multi-subscriber identification module (SIM) device and base stations (BS) according to an embodiment.

FIG. 1 is a view illustrating a wireless communication system. The wireless communication system 1 includes a multi-SIM device 100 and a first BS 10 and a second BS 20 according to an embodiment. The wireless communication system 1 may include, as a non-limiting example, a 5$^{th}$ generation wireless (5G) system, a long term evolution (LTE) system, a code division multiple access (CDMA) system, a wideband code division multiple access (WCDMA) system, a global system for mobile communications (GSM), a wireless local area network (WLAN) system, or another arbitrary wireless communication system. The multi-SIM device 100 may be connected to prescribed wireless communication networks through the first and second BSs 10 and 20. Information may be transmitted from the wireless communication networks by one of various multi-access methods such as code division multiple access (CDMA), WCDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. The multi-SIM device 100 and the first and second BSs 10 and 20 may communicate with each other and may transmit and receive a signal (or data) through various channels. In the current specification, transmitting and receiving a signal (or data) through a channel may be expressed as transmitting and receiving a channel. For convenience sake, in addition, a baseband processor 110 communicating with the first and second BSs 10 and 20 by using a first SIM 120_1 and a second SIM 120_2 may be expressed as the first and second SIMs 120_1 and 120_2 communicating with the first and second BSs 10 and 20. In other words, when such description is used, it will be understood that the baseband processor 110 is communicating with the first BS 10 and the second BS 20.

Referring to FIG. 1, the multi-SIM device 100 may include the baseband processor 110, the first SIM 120_1, the second SIM 120_2, and a memory 130. The first SIM 120_1 for using a first network service may be connected to a first network through the first BS 10. The second SIM 120_2 for using a second network service may be connected to a second network through the second BS 20.

The baseband processor 110 may include a first radio frequency (RF) resource 112_1 and a second RF resource 112_2. The first and second RF resources 112_1 and 112_2 may include circuits and paths for receiving channels from the first and second BSs 10 and 20 or tangible or intangible resources for processing transmitting/receiving channels. In an embodiment, the first RF resource 112_1 may support non-limiting channel configuration use in accordance with a radio resource control (RRC) protocol and the second RF resource 112_2 may support limiting channel configuration use in accordance with the RRC protocol. In detail, the first RF resource 112_1 may support processing on a channel handled by a prescribed SIM to maintain a network connection mode and a channel handled in an idle mode, and the second RF resource 112_2 may support only processing on a channel handled by a prescribed SIM in the idle mode. In addition, the channel handled by the SIM in the idle mode may have a periodic characteristic and may include scheduling information that informs transmission timing of the channel. For example, when the wireless communication system 1 is a WCDMA system, the channels handled for the SIM to maintain the network connection mode are a dedicated channel (DCH), a forward access channel (FACH), a random access channel (RACH), a broadcast channel (BCH), and a paging channel (PCH) and the channels handled by the SIM in the idle mode may be defined as a BCH and a PCH.

As described above, since the first RF resource 112_1 processes a non-periodic channel or a periodic channel by supporting the non-limiting channel configuration use in accordance with the RRC protocol, and the second RF resource 112_2 processes only the periodic channel by supporting the limiting channel configuration use in accordance with the RRC protocol, the first RF resource 112_1 supports processing on more kinds of channels than the second RF resource 112_2. Therefore, a configuration of the first RF resource 112_1 may be different from a configuration of the second RF resource 112_2. In detail, the complexity of the configuration of the first RF resource 112_1 may be higher than the complexity of the configuration of the second RF resource 112_2. Embodiments related to a difference in configuration between the first RF resource 112_1 and the second RF resource 112_2 will be described in detail in FIGS. 3, 4A, and 4B.

The first SIM 120_1 may receive at least one first channel 12 to use the first network service from the first BS 10. The second SIM 120_2 may receive at least one second channel 22 to use the second network service from the second BS 20. The first SIM 120_1 and the second SIM 120_2 use RF resources in order to process the first channel 12 and the second channel 22. The baseband processor 110 may selectively allot one of the first RF resource 112_1 and the second RF resource 112_2 to the first SIM 120_1 and the second SIM 120_2 based on information on the first network and the second network.

In an embodiment, the multi-SIM device 100 may operate in a dual radio (DR) mode or a dual SIM dual standby (DSDS) mode at the time the resources are allotted. In the DR mode, the first RF resource 112_1 and the second RF resource 112_2 are respectively allotted to the first and second SIMs 120_1 and 120_2 and communication operations with the first and second BSs 10 and 20 are performed by using the first and second RF resources 112_1 and 112_2. The baseband processor 110 may determine whether the multi-SIM device 100 may operate in the DR mode based on the information on the first network and the second network.

The baseband processor 110 configures one of the first SIM 120_1 and the second SIM 120_2 as a main SIM and configures the other one as a sub-SIM and then, may allot the main SIM to the first RF resource 112_1 and allot the sub-SIM to the second RF resource 112_2 when it is determined that the multi-SIM device 100 may operate in the DR mode. For example, when the first SIM 120_1 is configured as the main SIM and the second SIM 120_2 is configured as the sub-SIM, the first SIM 120_1 processes the first channel 12 received from the first BS 10 by using the first RF resource 112_1 and may perform an operation in a connection mode with the first network or perform an operation in the idle mode. The second SIM 120_2 processes the second channel 22 received from the second BS 20 by using the second RF resource 112_2 and may perform an operation in the idle mode. The operation in the connection mode may include an operation of actively exchanging data, for example, voice or data calls or sessions with at least one BS in the wireless communication system 1. The operation in the idle mode may include an operation of monitoring the channel, for example, the PCH or the BCH as a periodic channel having the periodic characteristic. In some embodiments, the operation in the idle mode may include only an operation of monitoring the channel having periodic characteristics.

When RF resource use request periods of the first and second SIMs 120_1 and 120_2 overlap, the multi-SIM device 100 according to an embodiment operates in the DR mode, allots the first RF resource 112_1 and the second RF resource 112_2 to the first and second SIMs 120_1 and 120_2 and then, may perform the communication operation through the first and second SIMs 120_1 and 120_2. The second RF resource 112_2 advantageous in terms of mass production expenses and an amount of power consumption is used in the DR mode and accordingly, communication performance at no less than a threshold level may be secured.

The baseband processor 110 allots the first RF resource 112_1 to one of the first SIM 120_1 and the second SIM 120_2 and accordingly, the multi-SIM device 100 operates in the DSDS mode when it is determined that the multi-SIM device 100 may not operate in the DR mode. In this configuration, the second RF resource 112_2 may be disabled. Furthermore, the multi-SIM device 100 may operate in the DSDS mode as a legacy mode.

The information on the first network and the information on the second network based on which it is determined whether the DR mode is accessible and based on which the main SIM and the sub-SIM are configured may include information on the at least one first channel 12 between the first network and the first SIM 120_1 and information on the at least one second channel 22 between the second network and the second SIM 120_2. That is, the information on the first channel 12 may include first channel configuration information and first scheduling information on the first channel 12, when the first channel 12 has the periodic characteristic. The first channel configuration information may represent a kind of the first channel 12. In addition, the information on the second channel 22 may include second channel configuration information and second scheduling information on the second channel 22, when the second channel 22 has the periodic characteristic. The second channel configuration information may represent a kind of the second channel 22.

The memory 130 may store the information on the first network and the information on the second network. Whenever the information on the first network and/or the information on the second network are updated, the memory 130 may store the updated information. The baseband processor 110 may access the memory 130, may read the information on the first network and the information on the second network, and may perform an operation according to the embodiments disclosed herein.

In FIG. 1, it is illustrated that the multi-SIM device 100 includes the two SIMs, that is, the first and second SIMs 120_1 and 120_2, and the baseband processor 110 includes the two RF resources, that is the first and second RF resources 112_1 and 112_2. However, this is only an example and the multi-SIM device 100 may include more SIMs and/or more RF resources. For example, the embodiments that are described hereinafter may be applied to a multi-SIM device including three or more SIMs or three or more RF resources.

Figure 2:
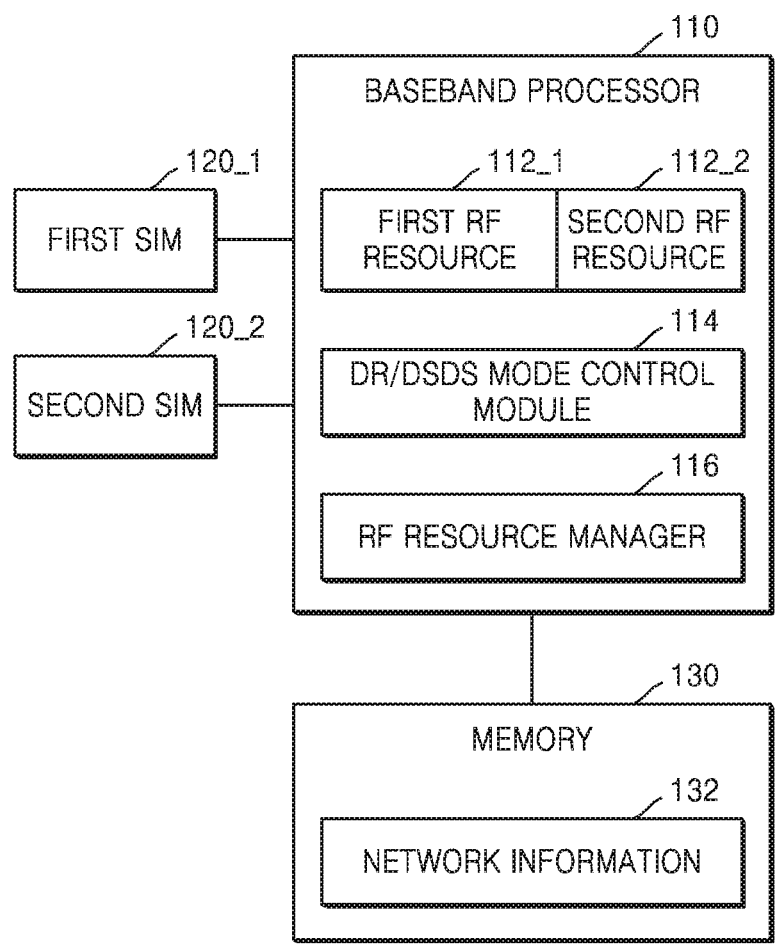
FIG. 2 is a block diagram illustrating a baseband processor according to an embodiment in detail.

FIG. 2 is a block diagram illustrating a baseband processor 110 according to an embodiment.

Referring to FIG. 2, the baseband processor 110 may include the first RF resource 112_1, the second RF resource 112_2, a DR/DSDS mode control module 114, and an RF resource manager 116. As described above, the first RF resource 112_1 may support the non-limiting channel configuration use and the second RF resource 112_2 may support the limiting channel configuration use.

The DR/DSDS mode control module 114 may read network information 132 stored in the memory 130 and may determine whether the multi-SIM device may operate in the DR mode. The DR/DSDS mode control module 114 may control the multi-SIM device to operate in the DR mode, or may control the multi-SIM device to operate in the DSDS mode or to maintain the DSDS mode in accordance with a determination result. A detailed embodiment of a method of configuring the DR mode and the DSDS mode will be described in detail in FIGS. 4A, 4B and 5.

When the multi-SIM device may operate in the DR mode, the RF resource manager 116 configures one of the first SIM 120_1 and the second SIM 120_2 as a main SIM and allots the first RF resource 112_1 to the main SIM, and configures the other one of the first SIM 120_1 and the second SIM 120_2 as a sub-SIM and may allot the second RF resource 112_2 to the sub-SIM. The configuration and allotment are based on the network information 132. In an embodiment, the RF resource manager 116 may further include a channel configuration unit that provides configuration information generated based on the RRC protocol with a network corresponding to the first SIM 120_1 and configuration information generated based on the RRC protocol with a network corresponding to the second SIM 120_2 to the first RF resource 112_1 and the second RF resource 112_2 and may perform channel configuration on each of the first RF resource 112_1 and the second RF resource 112_2. Hereinafter, the channel configuration may refer to an operation of configuring parameters for a plurality of operations performed in order to process a channel received by a predetermined RF resource, and processing information on the parameters that may be received through the RRC protocol. In an embodiment, first type channel configuration corresponding to a non-periodic channel and second type channel configuration corresponding to a periodic channel may be performed on the first RF resource 112_1, and the second type channel configuration corresponding to the periodic channel may be performed on the second RF resource 112_2.

The memory 130 may store the network information 132 including the information on the first network corresponding to the first SIM 120_1 and the information on the second network corresponding to the second SIM 120_2. The information on the first network is generated based on at least one first channel received by the first SIM 120_1 from the first network. The information on the second network may be generated based on at least one second channel received by the second SIM 120_2 from the second network.

The network information 132 may be updated whenever the information on the first network of the first SIM 120_1 and/or the information on the second network of the second SIM 120_2 are updated.

In an embodiment, the DR/DSDS mode control module 114 and the RF resource manager 116 may be implemented as hardware logic in the baseband processor 110. In another embodiment, the DR/DSDS mode control module 114 and the RF resource manager 116 may be implemented as software logic stored as a plurality of command codes in the memory 130 and executed by the baseband processor 110, which is only an exemplary embodiment. Therefore, without being limited thereto, each of the first and second RF resources 112_1 and 112_2, the DR/DSDS mode control module 114, and the RF resource manager 116 may be implemented by various kinds of logic.

Figure 3:
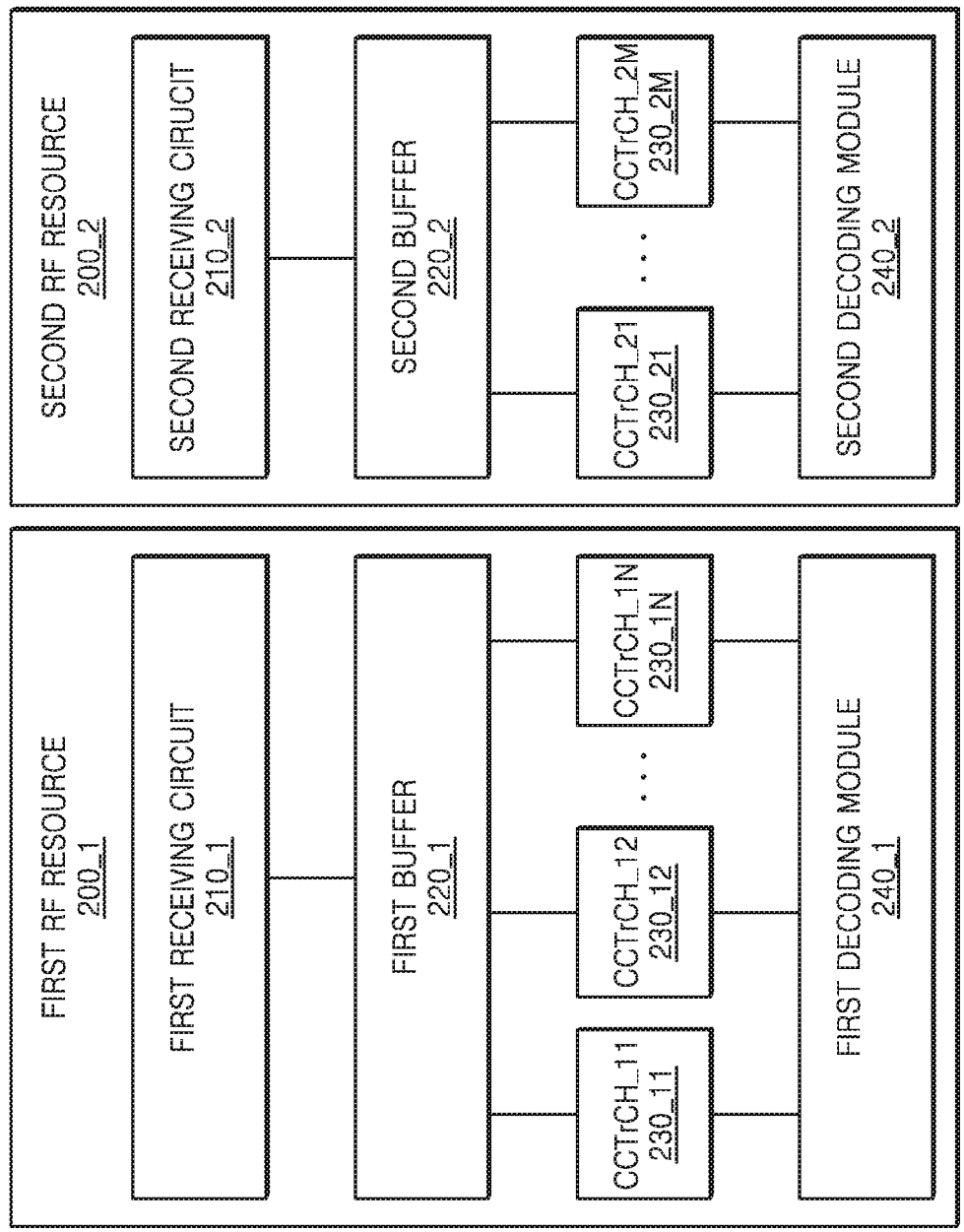
FIG. 3 is a block diagram illustrating configurations of a first radio frequency (RF) resource and a second RF resource according to an embodiment.

FIG. 3 is a block diagram illustrating configurations of a first RF resource 200_1 and a second RF resource 200_2 according to an embodiment.

Referring to FIG. 3, the first RF resource 200_1 may include a first receiving circuit 210_1, a first buffer 220_1, a plurality of first coded composite transport channel (CC-TrCH) blocks 230_11 to 230_1N, and a first decoding module 240_1. The second RF resource 200_2 may include a second receiving circuit 210_2, a second buffer 220_2, a plurality of second CCTrCH blocks 230_21 to 230_2M, and a second decoding module 240_2.

The first receiving circuit 210_1 may receive the periodic channel or the non-periodic channel from a network corresponding to a main SIM. The first receiving circuit 210_1 may transmit the channel to the first buffer 220_1 and may generate a frame boundary interrupt whenever the channel by a prescribed frame unit (for example, a 10 msec unit) is transmitted to the first buffer 220_1. The frame boundary interrupt may be a signal for informing the channel configuration unit of the RF resource manager 116 of FIG. 2 of channel configuration start timing for the first RF resource 200_1. Each of the first CCTrCH blocks 230_11 to 230_1N may provide the channel stored in the first buffer 220_1 to the first decoding module 240_1 in units of CCTrCHs. The CCTrCH may refer to a channel obtained by multiplexing one or a plurality of transport channels (TrCH). In addition, the TrCH may refer to an interface channel between a physical layer and an upper layer (for example, a media access control (MAC) layer). Hereinafter, providing the channel to the decoding module in units of CCTrCHs may denote providing data symbols included in the channel to the decoding module in units of CCTrCHs. In an embodiment, some of the first CCTrCH blocks 230_11 to 230_1N are previously configured to provide the non-periodic channel to the first decoding module 240_1 in units of CCTrCHs and the remaining blocks may be previously configured to provide the periodic channel to the first decoding module 240_1 in units of CCTrCHs. For example, some of the first CCTrCH blocks 230_11 to 230_1N may be previously configured so that a first CCTrCH block 230_11 provides the DCH to the first decoding module 240_1 in units of CCTrCHs, that a first CCTrCH block 230_12 provides PCH to the first decoding module 240_1 in units of CCTrCHs, and that a first CCTrCH block 230_1N provides BCH to the first decoding module 240_1 in units of CCTrCHs. Therefore, a processing path in the first RF resource 200_1 through the first CCTrCH blocks 230_11 to 230_1N may be selected in accordance with a kind of a channel. For example, in the case of the DCH, a processing path provided to the first decoding module 240_1 through the first CCTrCH block 230_11 may be selected, in the case of the PCH, a processing path provided to the first decoding module 240_1 through the first CCTrCH block 230_12 may be selected, and, in the case of the BCH, a processing path provided to the first decoding module 240_1 through the first CCTrCH block 230_1N may be selected. The first decoding module 240_1 may perform the first type channel configuration corresponding to the non-periodic channel and the second type channel configuration corresponding to the periodic channel. The first decoding module 240_1 may perform channel configuration suitable for a received channel and accordingly, the channel may be processed.

The second receiving circuit 210_2 may receive the periodic channel from the network corresponding to a sub-SIM. The second receiving circuit 210_2 may transmit the channel to the second buffer 220_2 and may generate the frame boundary interrupt whenever the channel by the prescribed frame unit (for example, 10 msec unit) is transmitted to the second buffer 220_2. The frame boundary interrupt may be a signal for informing the channel configuration unit of the RF resource manager 116 of FIG. 2 of channel configuration start timing for the second RF resource 200_2. Each of the second CCTrCH blocks 230_21 to 230_2M may provide the channel stored in the second buffer 220_2 to the second decoding module 240_2 in units of CCTrCHs. In an embodiment, the second CCTrCH blocks 230_21 to 230_2M may be previously configured so as to provide the periodic channel to the second decoding module 240_2 in units of CCTrCHs. For example, the second CCTrCH blocks 230_21 to 230_2M may be previously configured so that a second CCTrCH block 230_21 provides the PCH to the second decoding module 240_2 in units of CCTrCHs and that a second CCTrCH block 230_2M provides the BCH to the second decoding module 240_2 in units of CCTrCHs. Therefore, a processing path in the second RF resource 200_2 through the second CCTrCH blocks 230_21 to 230_2M may be selected in accordance with a kind of a channel. For example, in the case of the PCH, a processing path provided to the second decoding module 240_2 through the second CCTrCH block 230_21 may be selected and, in the case of the BCH, a processing path provided to the second decoding module 240_2 through the second CCTrCH block 230_2M may be selected. The second decoding module 240_2 may perform the second type channel configuration corresponding to the periodic channel. The second decoding module 240_2 may perform channel configuration suitable for a received channel and accordingly, the channel may be processed.

When components of the first RF resource 200_1 and components of the second RF resource 200_2 are compared, first, sizes of the components of the first RF resource 200_1 may be greater than sizes of the components of the second RF resource 200_2. In detail, sizes of the first receiving circuit 210_1, the first buffer 220_1, and the first decoding module 240_1 may be greater than sizes of the second receiving circuit 210_2, the second buffer 220_2, and the second decoding module 240_2. For example, the number of components of the first receiving circuit 210_1 may be greater than the number of components of the second receiving circuit 210_2, the number of components of the first decoding module 240_1 may be greater than the number of components of the second decoding module 2040_2 as described in more detail below, and the amount of memory used for the first buffer 220_1 may be greater than the amount of memory used for the second buffer 220_2. However, these are only examples, and size may refer to an amount of physical space taken up by the various components. Moreover, the number of first CCTrCH blocks 230_11 to 230_1N may be greater than the number of second CCTrCH blocks 230_21 to 230_2M.

The first RF resource 200_1 and the second RF resource 200_2 of FIG. 3 may be implemented as hardware, which is only an exemplary embodiment. One RF resource may be implemented as software so as to operate as the first RF resource 200_1 and the second RF resource 200_2. In addition, in some embodiments, the first RF resource 200_1 and the second RF resource 200_2 may further include encoding modules having different configurations. The spirit of the inventive concept applied to the first and second decoding modules 240_1 and 240_2 may be equally or similarly applied to the encoding modules.

Figure 4B:
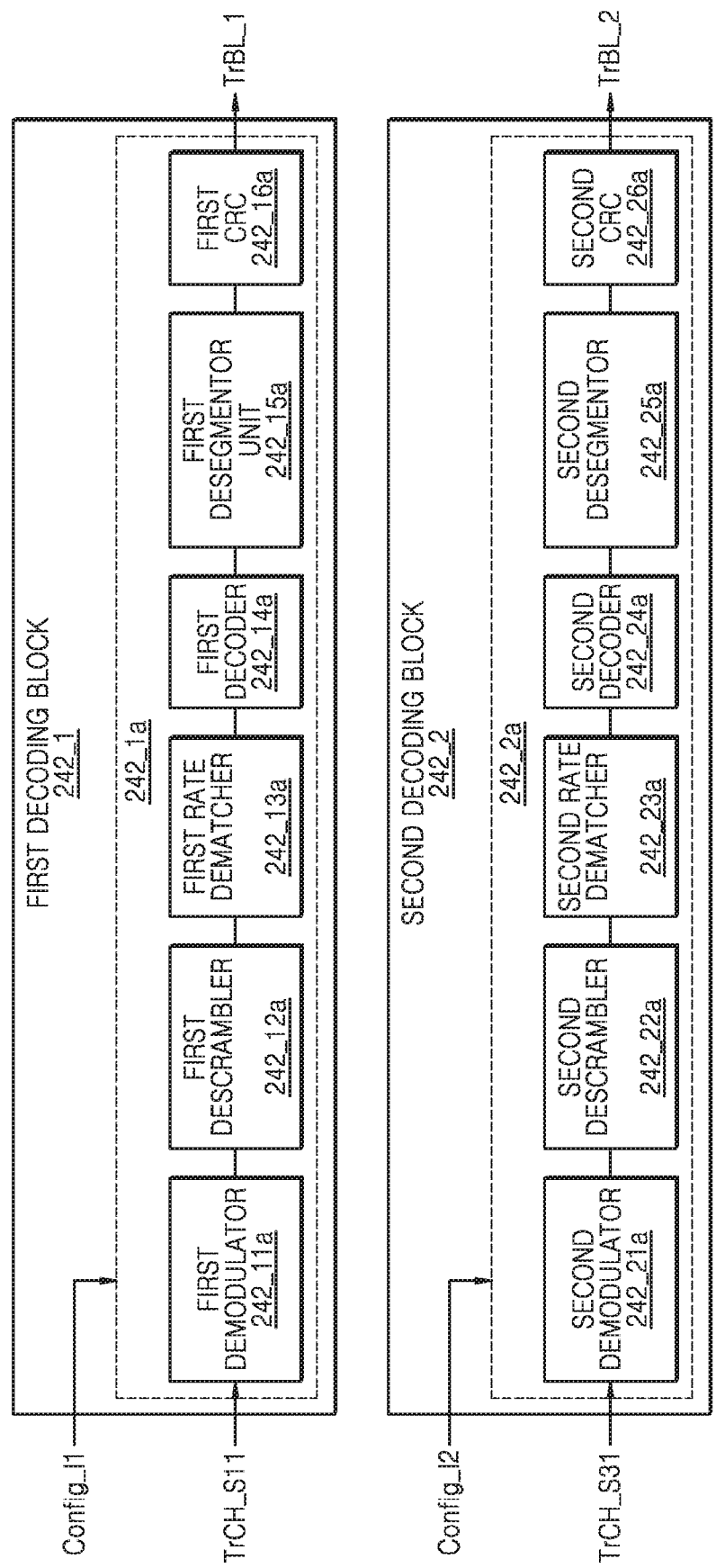

FIGS. 4A and 4B are block diagrams illustrating the first decoding module 240_1 and the second decoding module 240_2 of FIG. 3 in detail.

Referring to FIG. 4A, the first decoding module 240_1 may include a first demultiplexer 241_1 and a first decoding block 242_1, and the first decoding block 242_1 may include a first type decoding block 242_1a and a second type decoding block 242_1b. The first type decoding block 242_1a may perform the first type channel configuration corresponding to the non-periodic channel, and the second type decoding block 242_1b may perform the second type channel configuration corresponding to the periodic channel.

The first decoding module 240_1 may receive first CCTrCH data symbols CCTrCH_S1 from one of the first CCTrCH blocks 230_11 to 230_1N of FIG. 3 and may receive second CCTrCH data symbols CCTrCH_S2 from the other. The first demultiplexer 241_1 may generate first to kth TrCH data symbols TrCH_S11 to TrCH_S1$k$ by demultiplexing the first CCTrCH data symbols CCTrCH_S1 and may provide the generated first to kth TrCH data symbols TrCH_S11 to TrCH_S1$k$ to the first decoding block 242_1. In addition, the second CCTrCH data symbols CCTrCH_S2 may be directly provided to the first decoding block 242_1.

The first type decoding block 242_1a may receive TrCH data symbols corresponding to the non-periodic channel among the first to kth TrCH data symbols TrCH_S11 to TrCH_S1$k$ and may process the received TrCH data symbols. The second type decoding block 242_1b may receive TrCH data symbols corresponding to the periodic channel among the first to kth TrCH data symbols TrCH_S11 to TrCH_S1$k$ and may process the received TrCH data symbols. In addition, when the second CCTrCH data symbols CCTrCH_S2 correspond to the non-periodic channel, the second CCTrCH data symbols CCTrCH_S2 may be processed by the first type decoding block 242_1a and, when the second CCTrCH data symbols CCTrCH_S2 correspond to the periodic channel, the second CCTrCH data symbols CCTrCH_S2 may be processed by the second type decoding block 242_1b. The first decoding block 242_1 may generate prescribed transmission blocks by processing the first to kth TrCH data symbols TrCH_S11 to TrCH_S1$k$ or the second CCTrCH data symbols CCTrCH_S2 and may transmit the generated transmission blocks to an upper layer.

In FIG. 4A, it is illustrated that the first decoding block 242_1 includes the first type decoding block 242_1a and the second type decoding block 242_1b, which is only an exemplary embodiment. In other embodiments, the first decoding block 242_1 may include a greater number of first type decoding blocks and second type decoding blocks. In such a configuration, each of the first type decoding blocks of the first decoding block 242_1 may be connected to at least one of the first CCTrCH blocks 230_11 to 230_1N of FIG. 3 and each of the second type decoding blocks may be connected to at least one of the first CCTrCH blocks 230_11 to 230_1N.

The second decoding module 240_2 may include a second demultiplexer 241_2 and a second decoding block 242_2, and the second decoding block 242_2 may include a second type decoding block 242_2a. The second type decoding block 242_2a may perform the second type channel configuration corresponding to the periodic channel.

The second decoding module 240_2 may receive third CCTrCH data symbols CCTrCH_S3 from one of the second CCTrCH blocks 230_21 to 230_2M of FIG. 3 and may receive fourth CCTrCH data symbols CCTrCH_S4 from the other. The second demultiplexer 241_2 may generate the first to kth TrCH data symbols TrCH_S11 to TrCH_S1$k$ by demultiplexing the third CCTrCH data symbols CCTrCH_S3 and may provide some TrCH data symbols TrCH_S31 corresponding to the periodic channel to the second decoding block 242_2. In addition, the fourth CCTrCH data symbols CCTrCH_S4 may be directly provided to the second decoding block 242_2.

The second type decoding block 242_2a may receive the TrCH data symbols TrCH_S31 corresponding to the periodic channel and may process the received TrCH data symbols. In addition, when the fourth CCTrCH data symbols CCTrCH_S4 correspond to the periodic channel, the fourth CCTrCH data symbols CCTrCH_S4 may be processed by the second type decoding block 242_2a. The second decoding block 242_2 may generate prescribed transmission blocks by processing the TrCH data symbols TrCH_S31 or the fourth CCTrCH data symbols CCTrCH_S4 and may transmit the generated transmission blocks to an upper layer.

In FIG. 4A, it is illustrated that the second decoding block 242_2 includes the second type decoding block 242_2a, which is only an exemplary embodiment. In some embodiments, the second decoding block 242_2 may include a greater number of second type decoding blocks. In such a configuration, each of the second type decoding blocks of the second decoding block 242_2 may be connected to at least one of the second CCTrCH blocks 230_21 to 230_2M of FIG. 3.

Referring to FIG. 4B, the first type decoding block 242_1a of the first decoding block 242_1 may include a first demodulator 242_11a, a first descrambler 242_12a, a first rate dematcher 242_13a, a first decoder 242_14a, a first desegmentor 242_15a, and a first cyclical redundancy check (CRC) 242_16a.

In an embodiment, the first demodulator 242_11a may perform data demodulation on the TrCH symbols TrCH_S11. A demodulation method may be one of quadrature phase shift keying (QPSK), 16 quadrature amplitude modulation (QAM), and 64 QAM. Then, the first descrambler 242_12a may perform a descrambling operation on a signal output from the first demodulator 242_11a in units of bits. The first rate dematcher 242_13a may extract systematic bits and parity bits from a signal output from the first descrambler 242_12a through a deinterleaving operation. The first decoder 242_14a may decode a signal output from the first rate dematcher 242_13a by a prescribed decoding method. The first desegmentor 242_15a may perform a desegmentation operation on a signal output from the first decoder 242_14a. The first CRC 242_16a may perform a CRC operation by using a CRC bit included in a signal output from the first desegmentor 242_15a. Through the above-described operation, the first type decoding block 242_1a may generate at least one transmission block TrBL_1.

The second type decoding block 242_2a of the second decoding block 242_2 may include a second demodulator 242_21a, a second descrambler 242_22a, a second rate dematcher 242_23a, a second decoder 242_24a, a second desegmentor 242_25a, and a second CRC 242_26a.

The second type decoding block 242_2a may generate at least one transmission block TrBL_2 by processing the TrCH symbols TrCH_S31 in an operation similar to an operation of the first type decoding block 242_1a and detailed description thereof will not be given.

In an embodiment, the first type decoding block 242_1a and the second type decoding block 242_2a may be different from each other in at least one of a decoding method, a rate dematching method, and a CRC method. For example, the first decoder 242_14a may perform decoding by a turbo decoding method and the second decoder 242_24a may perform decoding by a tail-biting convolution decoding method. Since an amount of data of the TrCH symbols TrCH_S11 corresponding to the non-periodic channel is greater than an amount of data of the TrCH symbols TrCH_S31 corresponding to the periodic channel, a rate dematching method of the first rate dematcher 242_13a and a dematching method of the second rate dematcher 242_23a may be different from each other. In addition, since the number of CRC bits included in the TrCH symbols TrCH_S11 corresponding to the non-periodic channel is greater than the number of CRC bits included in the TrCH symbols TrCH_S11 corresponding to the periodic channel, a CRC method of the first CRC 242_16a and a CRC method of the second CRC 242_26a may be different from each other.

The first type decoding block 242_1a and the second type decoding block 242_2a may be different from each other in at least one of a decoding method, a rate dematching method, and a CRC method. Therefore, parameters for configuration may be different. The first type decoding block 242_1a may configure parameters for the respective blocks, that is, the first demodulator 242_11a, the first descrambler 242_12a, the first rate dematcher 242_13a, the first decoder 242_14a, the first desegmentor 242_15a, and the first cyclical redundancy check (CRC) unit 242_16a, based on first configuration information Config_I1. The second type decoding block 242_2a may configure parameters for the respective blocks, that is, the a second demodulator 242_21a, the second descrambler 242_22a, the second rate dematcher 242_23a, the second decoder 242_24a, the second desegmentor 242_25a, and the second CRC 242_26a, based on second configuration information Config_I2.

The above description is only an exemplary embodiment. In some embodiments, the first type decoding block 242_1a and the second type decoding block 242_2a may be different from each other in at least one of the demodulation method, a descrambling method, and a desegmentation method.

Figure 5:
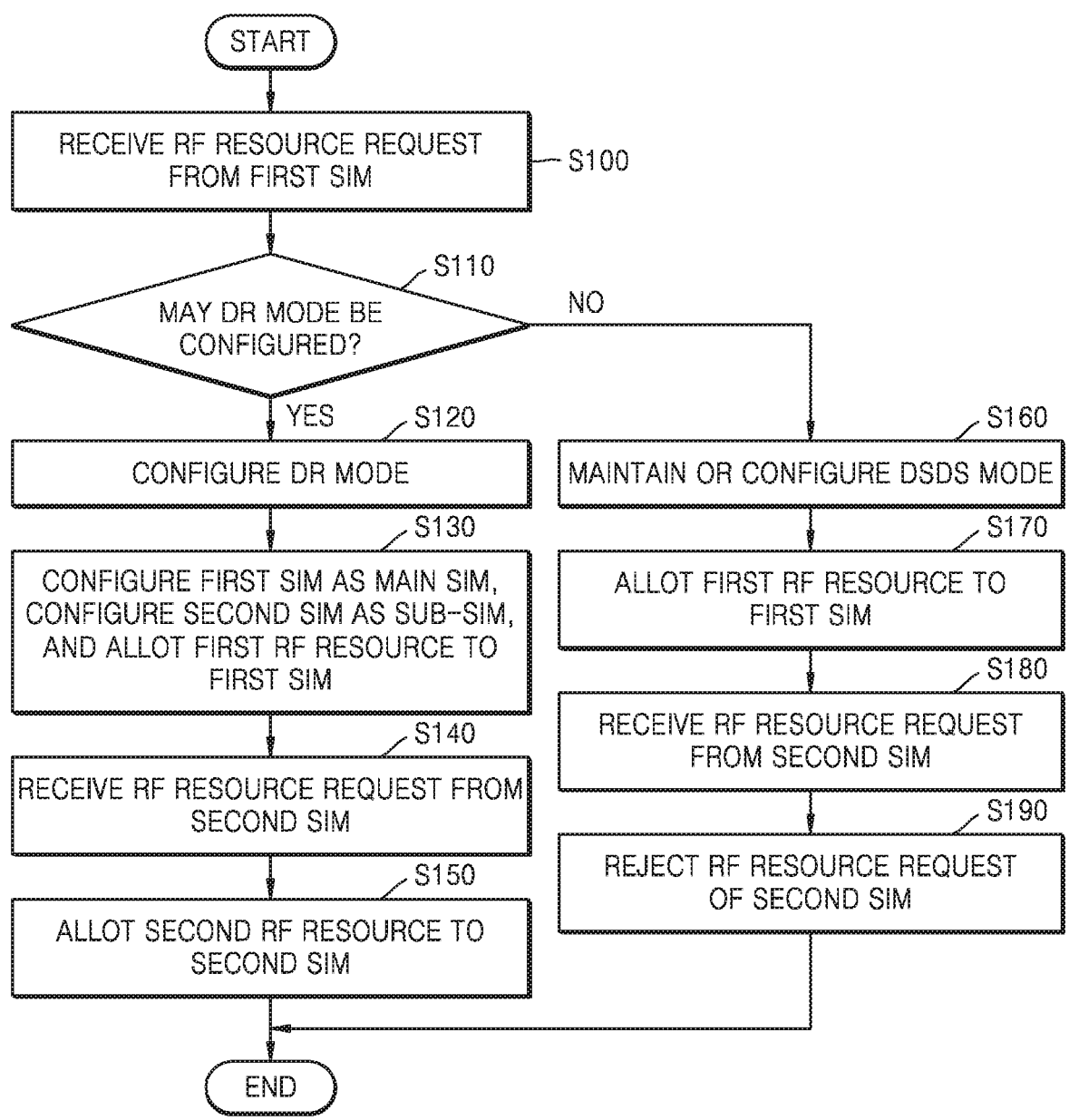
FIG. 5 is a flowchart illustrating a method of allotting the first RF resource and the second RF resource of the baseband processor of FIG. 2 according to an embodiment.

FIG. 5 is a flowchart illustrating a method of allotting the first RF resource 112_1 and the second RF resource 112_2 of FIG. 2 according to an embodiment. Hereinafter, in order to facilitate understanding, descriptions of FIG. 5 will be provided with reference to FIG. 2.

Referring to FIGS. 2 and 5, the baseband processor 110 may receive an RF resource request from the first SIM 120_1 in operation S100. That is, the first SIM 120_1 may request an RF resource in order to process a prescribed channel from a first network. The DR/DSDS mode control module 114 may determine whether the multi-SIM device may be configured in the DR mode in operation S110. For example, the DR/DSDS mode control module 114 may make the determination based on the network information 132 in response to the RF resource request. When it is determined that the multi-SIM device may be configured in the DR mode (operation S110, YES), the DR/DSDS mode control module 114 configures the multi-SIM device in the DR mode in operation S120. The RF resource manager 116 configures the first SIM 120_1 as the main SIM and configures the second SIM 120_2 as the sub-SIM based on the network information 132, and allots the first RF resource 112_1 to the first SIM 120_1 in operation S130. The baseband processor 110 may receive an RF resource request from the second SIM 120_2 in operation S140. That is, the second SIM 120_2 may request an RF resource in order to process a prescribed channel from a second network. The RF resource manager 116 may allot the second RF resource 112_2 to the second SIM 120_2 in operation S150 in response to the RF resource request of the second SIM 120_2.

Otherwise, when it is determined that the multi-SIM device may not be configured in the DR mode (operation S110, NO), the DR/DSDS mode control module 114 maintains or configures an operation mode of the multi-SIM device as the DSDS mode in operation S160. The first RF resource 112_1 may be allotted to the first SIM 120_1 in operation S170. The baseband processor 110 may receive an RF resource request from the second SIM 120_2 in operation S180. Since the multi-SIM device currently operates in the DS/DS mode and the RF resource 112_1 is allotted to the first SIM 120_1, the RF manager 116 may reject the RF resource request of the second SIM 120_2 in operation S190.

FIG. 6A is a flowchart illustrating operation S130 of FIG. 5 in detail and FIG. 6B is a flowchart illustrating operation S150 of FIG. 5 in detail.

Referring to FIGS. 3 and 6A, to perform operation S120 (FIG. 5), the baseband processor 110 may select a CCTrCH block in accordance with a first channel among CCTrCH blocks of the first RF resource at operation S132. For example, the baseband processor 110 may select at least one CCTrCH block in accordance with a kind of a first channel received by the first receiving circuit 210_1 among the first CCTrCH blocks 230_11 to 230_1N. In some embodiments, operation S132 may further include an operation of the baseband processor 110 determining the kind of the first channel. The baseband processor 110 may process the first channel by using the first type decoding block 242_1a or the second type decoding block 242_1b connected to the selected CCTrCH block in operation S134. The baseband processor 110 may process the first channel and provide a transmission block generated by processing the first channel to an upper layer in operation S136.

Referring to FIGS. 3 and 6B, to perform operation S140 (FIG. 5), the baseband processor 110 may select a CCTrCH block in accordance with a second channel among CCTrCH blocks of the second RF resource in operation S152. For example, the baseband processor 110 may select at least one CCTrCH block in accordance with a kind of a second channel received by the second receiving circuit 210_2 among the second CCTrCH blocks 230_21 to 230_2M. In some embodiments, operation S142 may further include an operation of the baseband processor 110 determining the kind of the second channel. The baseband processor 110 may process the second channel by using the second type decoding block 242_1b connected to the selected CCTrCH block in operation S154. The baseband processor 110 may process the second channel and provide a transmission block generated by processing the second channel to an upper layer in operation S156.

Figure 7:
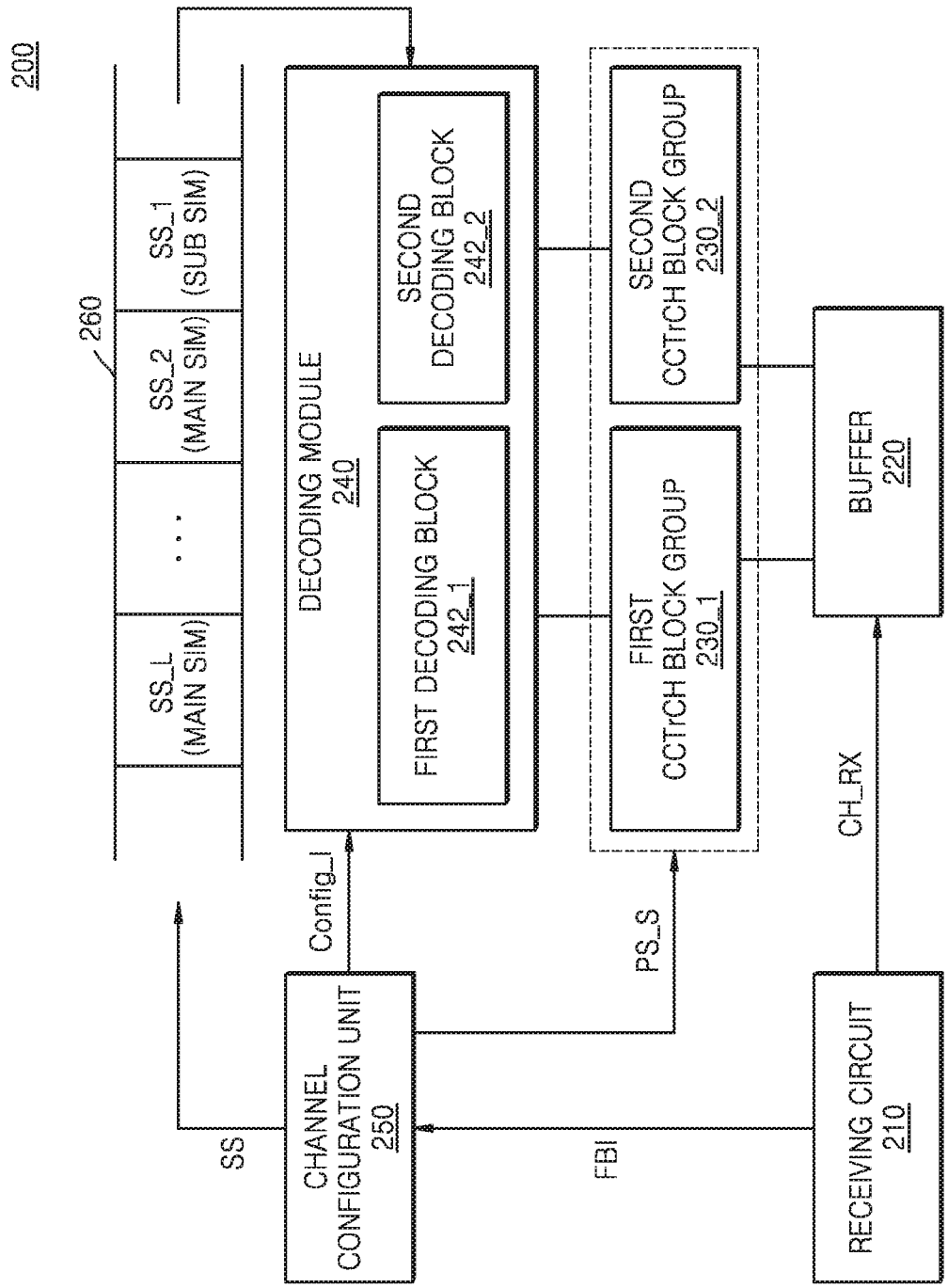
FIG. 7 is a block diagram illustrating an operation of a baseband processor according to an embodiment.

FIG. 7 is a block diagram illustrating an operation of a baseband processor 200 according to an embodiment.

The baseband processor 200 may include a receiving circuit 210, a buffer 220, a first CCTrCH block group 230_1, a second CCTrCH block group 230_2, a decoding module 240, a channel configuration unit 250, and a queue 260. The receiving circuit 210 may store a received channel CH_RX in the buffer 220 and generate the frame boundary interrupt and may provide the generated frame boundary interrupt to the channel configuration unit 250 whenever the received channel CH_RX by a predetermined frame unit is transmitted to the buffer 220. The channel configuration unit 250 may select a CCTrCH block allotted so as to transmit the channel CH_RX received in response to the frame boundary interrupt to the decoding module 240 from the first CCTrCH block group 230_1 and the second CCTrCH block group 230_2. That is, the channel configuration unit 250 provides a processing path selection signal PS_S to the first CCTrCH block group 230_1 and the second CCTrCH block group 230_2 and may select a prescribed CCTrCH block for transmitting the received channel CH_RX. For example, when the channel CH_RX is received from a network of the main SIM to which the first RF resource is allotted, the channel configuration unit 250 selects one CCTrCH block of the first CCTrCH block group 230_1 and may provide the channel CH_RX received through the selected CCTrCH block to the first decoding block 242_1 for supporting the non-limiting channel configuration. In another example, when the channel CH_RX is received from a network of the sub-SIM to which the second RF resource is allotted, the channel configuration unit 250 selects one CCTrCH block of the second CCTrCH block group 230_2 and may provide the channel CH_RX received through the selected CCTrCH block to the second decoding block 242_2 for supporting the limiting channel configuration.

The channel configuration unit 250 may perform channel configuration on the first decoding block 242_1 or the second decoding block 242_2 for processing the received channel CH_RX. The channel configuration unit 250 may perform the channel configuration by providing configuration information Config_I suitable for processing the channel CH_RX received in response to the frame boundary interrupt to the decoding module 240. For example, when the channel CH_RX is received from the network of the main SIM to which the first RF resource is allotted, the channel configuration unit 250 may perform the channel configuration suitable for the received channel CH_RX by providing the configuration information Config_I to the first decoding block 242_1. In another example, when the channel CH_RX is received from the network of the sub-SIM to which the second RF resource is allotted, the channel configuration unit 250 may perform the channel configuration suitable for the received channel CH_RX by providing the configuration information Config_I to the second decoding block 242_2.

When the channel configuration for the received channel CH_RX is completed, the channel configuration unit 250 may store a start signal SS for informing that the channel configuration for the received channel CH_RX is completed in the queue 260. The decoding module 240 may perform a processing operation in response to start signals SS_1 to SS_L output from the queue 260 by a first-in, first-out (FIFO) method. For example, in the example queue 260 shown in FIG. 7, the first start signal SS_1 is for informing that the channel configuration of the second decoding block 242_2 for processing the channel received from the network corresponding to the sub-SIM is completed. The second decoding block 242_2 may perform a processing operation on the channel in response to the first start signal SS_1. The second start signal SS_2 is for informing that the channel configuration of the first decoding block 242_1 for processing the channel received from the network corresponding to the main SIM is completed. The first decoding block 242_1 may perform a processing operation on the channel in response to the second start signal SS_2.

FIG. 8 is a view illustrating an operation of a multi-SIM device 100 according to an embodiment. In FIG. 8, it is assumed that the multi-SIM device 100 operates in the DR mode, that the first SIM 120_1 is configured as the main SIM and the first RF resource 112_1 is allotted to the main SIM, and that the second SIM 120_2 is configured as the sub-SIM and the second RF resource 112_2 is allotted to the sub-SIM.

Referring to FIG. 8, the first SIM 120_1 receives the periodic channel or the non-periodic channel from the first BS 10 by using the first RF resource 112_1 and may process the received channel and the second SIM 120_2 receives the periodic channel from the second BS 20 by using the second RF resource 112_2 and may process the received channel.

At the same time at which the first SIM 120_1 processes the periodic channel or the non-periodic channel through the first RF resource 112_2, the second SIM 120_2 processes the periodic channel through the second RF resource 112_2. Therefore, the second SIM 120_2 may maintain an idle mode with the second BS 20 of the second network and, in the idle mode, the second SIM 120_2 may perform a BS reselection operation and a handover operation from the second BS 20 to a third BS 30.

The second RF resource 112_2 according to an embodiment is advantageous in terms of mass production expenses and an amount of power consumption in comparison with the first RF resource 112_1. An operation for maintaining a connection relation between the second SIM 120_2 and the second network is performed by using the second RF resource 112_2 and accordingly, communication performance of the multi-SIM device 100 at no less than a threshold level may be secured.

Figure 9A:
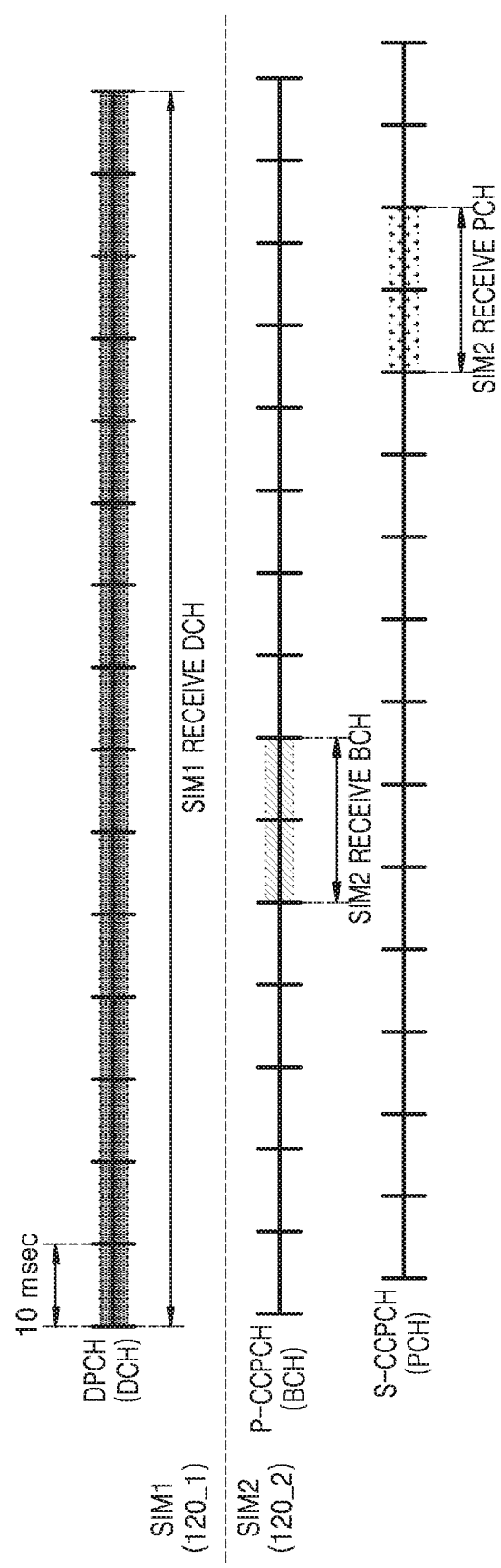
FIGS. 9A and 9B are views illustrating an operation of the multi-SIM device of FIG. 8 in detail.
Figure 9B:
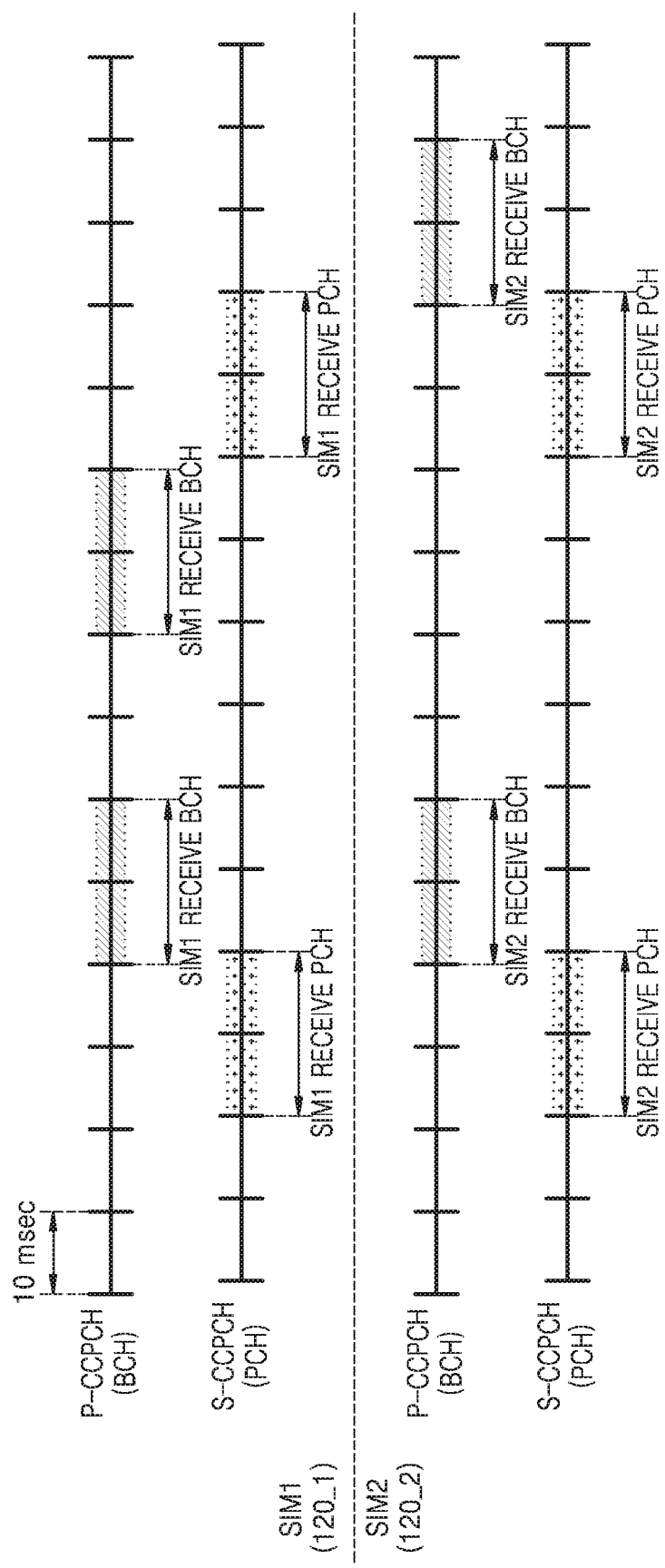

FIGS. 9A and 9B are views illustrating an operation of the multi-SIM device 100 of FIG. 8 in detail.

Referring to FIGS. 8 and 9A, when the multi-SIM device 100 operates in the DR mode, the first SIM (SIM1) 120_1 may continuously receive the DCH from the first BS 10 by using the first RF resource 112_1. The first SIM 120_1 may receive the DCH through a physical channel referred to as a dedicated physical channel (DPCH) formed between the multi-SIM device 100 and the first BS 10. At the same time, as shown in FIG. 9A, the second SIM (SIM2) 120_2 may simultaneously receive the BCH and/or the PCH from the second BS 20 by using the second RF resource 112_1. The second SIM 120_2 may receive the BCH through a physical channel referred to as a primary common control physical channel (P-CCPCH) formed between the multi-SIM device 100 and the second BS 20 and may receive the PCH through a physical channel referred to as a secondary common control physical channel (S-CCPCH) formed between the multi-SIM device 100 and the second BS 20.

Referring to FIGS. 8 and 9B, when the multi-SIM device 100 operates in the DR mode, the first SIM 120_1 may continuously receive the BCH and the PCH from the first BS 10 by using the first RF resource 112_1. The first SIM 120_1 may receive the BCH through the physical channel referred to as the P-CCPCH formed between the multi-SIM device 100 and the first BS 10, and may receive the PCH through the physical channel referred to as the S-CCPCH formed between the multi-SIM device 100 and the first BS 10. At the same time, the second SIM 120_2 may simultaneously receive the BCH and the PCH from the second BS 20 by using the second RF resource 112_1. The second SIM 120_2 may receive the BCH through the physical channel referred to as the P-CCPCH formed between the multi-SIM device 100 and the second BS 20 and may receive the PCH through the physical channel referred to as the S-CCPCH formed between the multi-SIM device 100 and the second BS 20.

FIG. 10 is a block diagram illustrating an electronic device 1000 according to an embodiment.

Referring to FIG. 10, the electronic device 1000 may include a memory 1010, a processor unit 1020, an input and output controller 1040, a display 1050, an input device 1060, and a communication processor 1090. Here, the memory 1010 may be plural. The respective components will be described as follows.

The memory 1010 may include a program storage 1011 for storing a program for controlling an operation of the electronic device 1000 and a data storage 1012 for storing data generated while performing the program. The data storage 1012 may store data for operations of an application program 1013, a DR/DSDS mode control program 1014, and an RF resource manager 1015. The program storage 1011 may include the application program 1013, the DR/DSDS mode control program 1014, and the RF resource manager 1015. Here, the program included in the program storage 1011 as a set of instructions may be expressed as an instruction set.

The application program 1013 may include an application program that operates in the electronic device 1000. That is, the application program 1013 may include instructions of an application driven by a processor 1022. The DR/DSDS mode control program 1014 may control an operation of determining the DR mode and allotment of RF resources RF_Ss for supporting the non-limiting/limiting channel configuration use according to embodiments. That is, through the DR/DSDS mode control program 1014, the electronic device 1000 may perform the operation of determining the DR mode and the allotment of the RF resources RF_Ss for supporting the non-limiting/limiting channel configuration use according to the embodiments. The RF resource manager 1015 allots the RF resources RF_Ss according to the embodiments described herein to the SIMs in accordance with an operation mode and may perform the channel configuration suitable therefor.

A peripheral device interface 1023 may control connection between an input and output peripheral device of a BS and the processor 1022 and the memory interface 1021. The processor 1022 may perform control and accordingly, the BS may provide a corresponding service by using at least one software program. The processor 1022 may execute at least one program stored in the memory 1010 and may provide a service corresponding to the corresponding program. In addition, the processor 1022 may include the RF resources RF_RSs for supporting the non-limiting/limiting channel configuration use according to the embodiments described herein.

The input and output controller 1040 may provide an interface between an input and output device such as the display 1050 or the input device 1060 and the peripheral device interface 1023. The display 1050 displays status information, input characters, moving picture, and still picture. For example, the display 1050 may display application program information driven by the processor 1022.

The input device 1060 may provide input data generated by selection of the electronic device to the processor unit 1020 through the input and output controller 1040. At this time, the input device 1060 may include a keypad including at least one hardware button and a touch pad for sensing touch information. For example, the input device 1060 may provide the touch information such as a touch, a touch motion, and a touch release sensed through the touch pad to the processor 1022 through the input and output controller 1040.

The electronic device 1000 may include a communication processor 1090 for performing a communication function for voice communication and data communication, and the DR/DSDS mode control program 1014 may control the communication processor 1090 so as to receive a channel from a BS to be suitable for the allotment of the RF resources RF_RSs.

Figure 11:
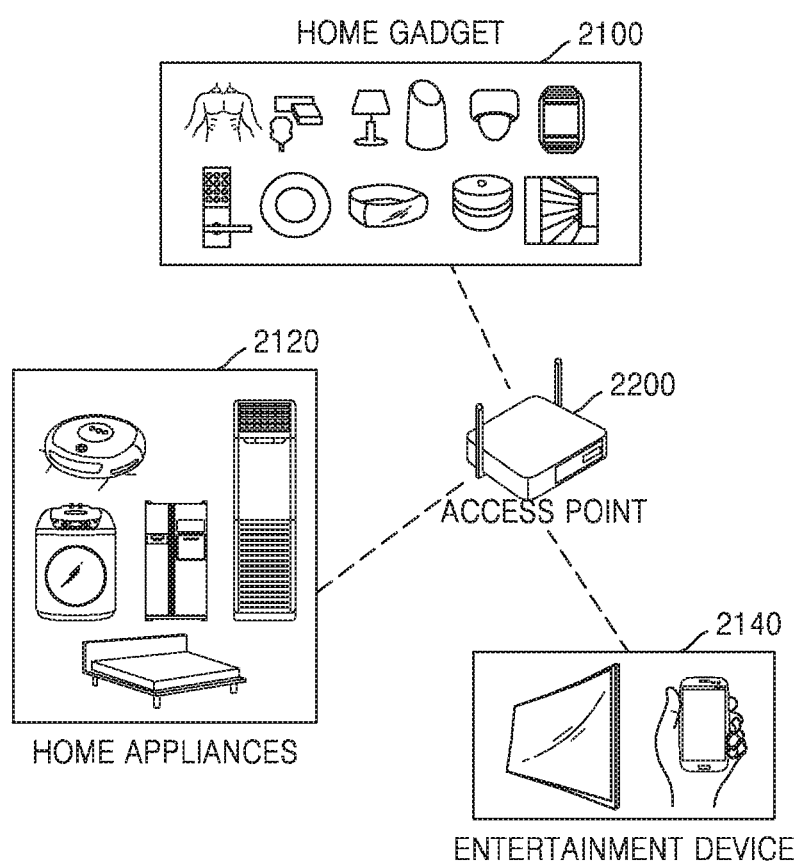
FIG. 11 is a view illustrating communication devices that perform transmission and reception beam pattern determining operations according to an embodiment.

FIG. 11 is a view illustrating communication devices that perform transmission and reception beam pattern determining operations according to an embodiment.

Referring to FIG. 11, home gadgets 2100, home appliances 2120, entertainment devices 2140, and an access point (AP) 2200 may perform a DR mode configuration operation, a RF resource allotting operation, and a channel configuration operation according to embodiments described herein. In some embodiments, the home gadget 2100, the home appliances 2120, the entertainment device 2140, and the AP 2200 may form an Internet of Things (IoT) network system. The communication devices illustrated in FIG. 11 are only exemplary. The wireless communication device according to an exemplary embodiment may be included in other communication devices that are not illustrated in FIG. 11.

While the inventive concept has been particularly shown and described with reference to embodiments thereof, it will be understood that various changes in form and details may be made therein without departing from the spirit and scope of the following claims.

What is claimed is:

1. A multi-subscriber identification module (SIM) device comprising:
a first SIM for using a first service of a first network;
a second SIM for using a second service of a second network;
a first radio frequency (RF) resource that supports a non-limiting channel configuration use in accordance with a radio resource control (RRC) protocol and processes a non-periodic channel or a periodic channel;
a second RF resource that supports a limiting channel configuration use in accordance with the RRC protocol and processes a periodic channel; and
a baseband processor that, in a dual radio (DR) mode of the multi-SIM device, configures one of the first SIM and the second SIM as a main SIM based on information on the first network and the second network, allots the first RF resource to the main SIM, configures the other one of the first SIM and the second SIM as a sub-SIM, and allots the second RF resource to the sub-SIM.

2. The multi-SIM device of claim 1, wherein a first number of first components of the first RF resource are greater than a second number of second components of the second RF resource.

3. The multi-SIM device of claim 1,
wherein the first RF resource comprises a first decoding module provided with at least one first type decoding block performing a first type channel configuration corresponding to the non-periodic channel and at least one second type decoding block performing a second type channel configuration corresponding to the periodic channel, and
wherein the second RF resource comprises a second decoding module provided with the at least one second type decoding block performing the second type channel configuration corresponding to the periodic channel.

4. The multi-SIM device of claim 3, wherein the at least one first type decoding block is different from the at least one second type decoding block in at least one of a decoding method, a rate dematching method, and a cyclical redundancy check (CRC) method.

5. The multi-SIM device of claim 3,
wherein the first RF resource comprises a plurality of first coded composite traffic channel (CCTrCH) blocks that provide a channel received from a network corresponding to the main SIM to the first decoding module in units of CCTrCHs, and
wherein the second RF resource comprises a plurality of second CCTrCH blocks for providing a channel received from a network corresponding to the sub-SIM to the second decoding module in units of CCTrCHs.

6. The multi-SIM device of claim 5,
wherein a first portion of the plurality of first CCTrCH blocks provide the non-periodic channel to the first decoding module in units of CCTrCHs and a first remaining portion of the plurality of first CCTrCH blocks provide the periodic channel to the first decoding module in units of CCTrCHs, and
wherein the plurality of second CCTrCH blocks provide the periodic channel to the second decoding module in units of CCTrCHs.

7. The multi-SIM device of claim 6,
wherein the periodic channel comprises a paging channel (PCH) and a broadcast channel (BCH), and
wherein a second portion of the plurality of second CCTrCH blocks provide the PCH to the second decoding module in units of CCTrCHs and a second remaining portion of the plurality of second CCTrCH blocks provide the BCH to the second decoding module in units of CCTrCH.

8. The multi-SIM device of claim 3,
wherein the baseband processor performs a channel configuration suitable for channels received from the first network and the second network on the first decoding module and the second decoding module, and
wherein the first decoding module and the second decoding module perform processing operations in an order in which the channel configuration is completed.

9. The multi-SIM device of claim 1,
wherein the first RF resource comprises a first buffer that processes the non-periodic channel or the periodic channel,
wherein the second RF resource comprises a second buffer that processes the periodic channel, and
wherein a first size of the first buffer is greater than a second size of the second buffer.

10. The multi-SIM device of claim 1, wherein the baseband processor selects one of the DR mode and a dual SIM dual standby (DSDS) mode based on the information, and controls the multi-SIM device to operate according to the selected mode at a time at which a first RF resource use request period of the first SIM and a second RF resource use request period of the second SIM overlap.

11. The multi-SIM device of claim 10, wherein the baseband processor selects the DSDS mode, and in the DSDS mode of the multi-SIM device, the baseband processor allots the first RF resource to one of the first SIM and the second SIM based on the information.

12. The multi-SIM device of claim 1,
wherein the main SIM performs a first communication operation with a network corresponding to the main SIM in a network connection mode or an idle mode, and
wherein the sub-SIM simultaneously performs a second communication operation with a network corresponding to the sub-SIM with the first communication operation in the idle mode.

13. A multi-subscriber identification module (SIM) device comprising:
a plurality of SIMs;
a plurality of radio frequency (RF) resources allotted to the plurality of SIMs to process a plurality of channels received from a plurality of networks corresponding to the plurality of SIMs; and
in response to RF resource use request periods of at least two object SIMs among the plurality of SIMs overlapping, a baseband processor allots a first RF resource capable of being configured for non-periodic channel processing or periodic channel processing among the plurality of RF resources to a SIM configured as a main SIM among the at least two object SIMs and allots a second RF resource capable of being configured for the periodic channel processing among the plurality of RF resources to a SIM configured as a sub-SIM among the at least two object SIMs.

14. The multi-SIM device of claim 13,
wherein the first RF resource comprises:
a first receiving circuit that receives a first channel from a network corresponding to the main SIM;
a first buffer that stores the first channel;
a first decoding module that processes the first channel; and
a plurality of first CCTrCH blocks that provide the first channel stored in the first buffer to the first decoding module in units of CCTrCHs, and
wherein the second RF resource comprises:
a second receiving circuit that receives a second channel from a network corresponding to the sub-SIM;
a second buffer that stores the second channel;
a second decoding module that processes the second channel; and
a plurality of second CCTrCH blocks that provide the second channel stored in the second buffer to the second decoding module in units of CCTrCHs.

15. The multi-SIM device of claim 14,
wherein the first decoding module is configured to perform a first type channel configuration corresponding to the non-periodic channel and a second type channel configuration corresponding to the periodic channel, and
wherein the second decoding module is configured to perform a second type channel configuration corresponding to the periodic channel.

16. The multi-SIM device of claim 14, wherein a first number of the plurality of first CCTrCH blocks is greater than a second number of the plurality of second CCTrCH blocks.

17. The multi-SIM device of claim 14,
wherein the periodic channel comprises a paging channel (PCH) and a broadcast channel (BCH), and
wherein a portion of the plurality of second CCTrCH blocks are configured to provide the PCH to the second decoding module and a remaining portion of the plurality of second CCTrCH blocks are configured to provide the BCH to the second decoding module.

18. The multi-SIM device of claim 13,
wherein the baseband processor performs a first channel configuration on the first RF resource based on radio resource control (RRC) with a network corresponding to the main SIM and performs a second channel configuration on the second RF resource based on the RRC with a network corresponding to the sub-SIM, and
wherein the first RF resource and the second RF resource start channel processing operations based on an order in which the first channel configuration and the second channel configuration are completed.

19. A method of operating a multi-subscriber identification module (SIM) device including a plurality of SIMs, the method comprising:
generating a radio frequency (RF) resource request from one object SIM among the SIMs;
determining whether the one object SIM is configured as a main SIM to which a first RF resource is allotted or a sub-SIM to which a second RF resource is allotted; and
in response to determining that the one object SIM is configured as the main SIM, performing non-limiting channel configuration for processing a non-periodic channel or a periodic channel on the first RF resource, and
in response to determining that the one object SIM is configured as the sub-SIM, performing limiting channel configuration for processing the periodic channel on the second RF resource.

20. The method of claim 19, wherein, in response to the one object SIM being configured as the sub-SIM, the performing of the limiting channel configuration comprises:
determining a kind of the periodic channel received from a network corresponding to the one object SIM;
allotting a processing path in the second RF resource suitable for the kind of the periodic channel that is determined; and
performing the limiting channel configuration on the second RF resource based on radio resource control (RRC) with the network.

\* \* \* \* \*